Sept. 23, 1924.
T. YAMAMOTO ET AL
INDUCTION SYNCHRONOUS MOTOR
Filed July 16, 1921
1,509,331
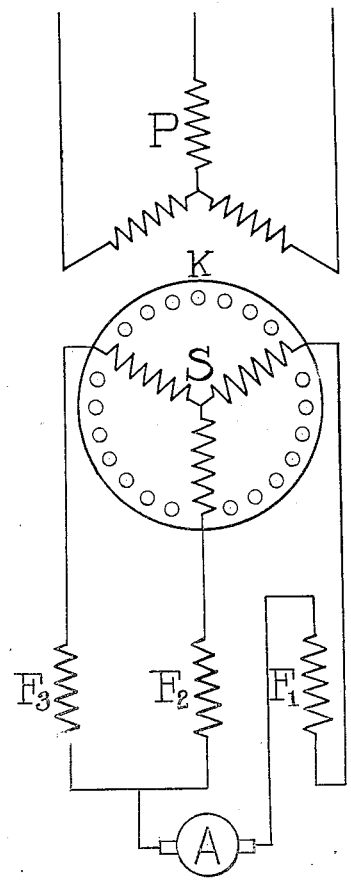

Patented Sept. 23, 1924.

1,509,331

UNITED STATES PATENT OFFICE.

TADAOKI YAMAMOTO AND MASATARO KAWARADA, OF TOKYO, JAPAN.

INDUCTION SYNCHRONOUS MOTOR.

Application filed July 16, 1921. Serial No. 485,196.

*To all whom it may concern:*

Be it known that we, TADAOKI YAMAMOTO and MASATARO KAWARADA, both subjects of the Emperor of Japan, residing at 344 Takata, Takata-machi, county of Kitatoyoshima, Prefecture of Tokyo, Japan, and 1132 Yanakamoto, Nippori-cho, county of Kitatoyoshima, Prefecture of Tokyo, Japan, have invented certain new and useful Improvements in Induction Synchronous Motors; and we do declare the following to be a clear, full, and exact description of the same, reference being had to the accompanying drawings, and to the characters of reference marked thereon, which form a part of this specification.

This invention relates to improvements in induction-start, self-exciting, self-synchronizing motor in which a series generator or motor is connected in cascade to the secondary winding of an induction motor.

The generation of electromotive force in a direct current series generator which is rotated at a constant speed has its origin at first with the residual magnetism on the magnet poles. It then gradually increases with the increasing load-current due to its self-exciting characteristic. For the establishment of the magnetic field, the amount of the residual magnetism and the speed of rotation must not each lie below a certain limit and also the resistance of the circuit must not exceed a certain value.

Let us suppose that we have a direct current series generator having preferably a laminated field-system rotated at a high constant speed and suppose also that an alternating current is supplied to the machine from an external source. If we now gradually diminish the frequency of the said alternating current, keeping its intensity constant all the time, from a commercial to a sufficiently low value, in its initial stage of variation when the frequency is still high the only effect of the alternating current would be in annihilating the residual magnetism of the machine. As the frequency is gradually diminished, however, the alternating current would have more tendency to act on the machine as a direct than as an alternating current. This is due to the fact that a direct current may be considered as an alternating current of a very low frequency or an alternating current in which the period of pulsation has been made indefinitely large. Thus when the frequency of the alternating current is diminished below a certain limit it happens that the machine receives a supply of unidirectional current for a certain length of time. Consequently, a sufficient time will be given for the magnetic field to establish itself and from this instant on the machine will operate as a direct current series generator giving rise to a full induced electromotive force in the armature.

The present invention utilizes the aforementioned property of the series wound machine by connecting same in cascade with the secondary winding of an induction motor and preferably by connecting mechanically both machines directly to each other.

In an aggregate formed in this manner if an alternating current is supplied to it on the induction motor side, the aggregate will start as an ordinary induction motor, the series wound machine which is connected in series with the rotor winding of the induction motor serving only as an external secondary reactance. As the aggregate is started and gains in speed, the rotor frequency will diminish and when it goes down to a certain sufficiently low value, the magnetic field of the series generator will be established in one or the other direction according to the circumstances, and from this time on the series wound machine will operate as a direct current series generator supplying a direct current to the rotor winding of the induction motor. This current flowing in the rotor winding produces a stationary magnetic field along the periphery of the rotor core and thus the rotor will be attracted by the rotating field produced by the stator winding and in this manner the aggregate will be synchronized automatically. After this the aggregate will continue to run as a self-exciting synchronous motor, the direct connected series generator serving as the exciter.

According to our invention, in order to increase the starting torque, a high resistance squirrel-cage winding is provided on the secondary core. On stepping of the aggregate into synchronism this winding will be put out of commission of itself.

According to another feature of our invention, in order to prevent a rush of current at starting, and also to prevent the premature establishment of the field of a series-wound machine connected in cascade with the rotor of a motor having a three-phase winding, a high reactance is provided in each phase of the secondary circuit. This reactance is furnished by the field winding of the series generator, by dividing the same into three separate sections corresponding to the number of phases of the secondary winding. In this case, since an algebraic sum of balanced three-phased currents vanishes at every moment, one of these sections has to be connected in a reversed sense to the two others in order to obtain a magnetically cumulative effect. The high reactance thus introduced in the secondary circuit will effectively limit the secondary current, and consequently the primary current, at starting. As the machine gains in speed, the reactance will decrease of itself according as the secondary frequency decreases and it finally becomes nil at synchronism.

The accompanying drawing is a diagrammatic representation of one form of the invention.

Referring to the figure, P designates the primary winding, S the secondary winding of an induction motor. A is the armature of a direct current series machine, the field winding of which is subdivided into three sections $F^1$, $F^2$ and $F^3$. That is to say, $F^1$, $F^2$ and $F^3$ are the sections of a winding provided on a corresponding pair of poles. Each one terminal of these three sections is connected to the secondary terminals of the induction motor and the other terminals are connected to the armature A of the series machine, in such a manner that two of them $F^2$ and $F^3$ are arranged in parallel and the remaining one $F^1$ is connected in the reversed way, so that the magnetizing actions of these three sections of the coils are cumulative as is very well known in this art.

On the rotor of the induction motor a high resistance squirrel cage winding K is provided to make the aggregate self starting. The squirrel cage winding will be at rest in relation to the rotating field as soon as the aggregate shall have attained synchronism. Consequently, no loss of energy will be caused by its presence during the synchronous operation of the aggregate.

In the figure the connection has been shown for a machine wound for three phase. Similar connections may easily be had for a two-phase or other multi-phase windings.

Having now particularly described and ascertained the nature of our said invention and in what manner the same is to be performed we declare that what we claim is:—

1. An induction-starting, self-synchronizing motor comprising an induction motor connected in cascade with a direct current series generator and mechanically coupled thereto, the stator winding of the induction motor being in the primary circuit and the rotor of the induction motor having a winding which forms a secondary circuit and includes a direct current series generator, the rotor of the induction motor being also provided with a high resistance squirrel cage winding, said aggregate apparatus being characterized by the fact that at starting the field winding of the series generator furnishes a sufficient reactance to the motor circuit to prevent a big current from flowing in the said circuit while the squirrel cage winding supplies the main portion of the torque, and as the speed increases the said reactance gradually diminishes and allows bigger secondary currents to flow in the rotor circuit to let it furnish the main portion of the torque, and finally allows the aggregate to step into synchronism.

2. An induction-starting, self-synchronizing motor comprising an induction motor connected in cascade with a direct current series generator and mechanically coupled thereto, the stator winding of the induction motor being in the primary circuit and the rotor of the induction motor having a three phase winding connected to the series generator, the field winding of which is divided into three separate sections, one of these sections being connected to one of the three phase windings of the rotor of the induction motor in a reverse sense to the two others, in such a manner that the currents induced in the phases of the rotor winding act cumulatively magnetically as they flow through said field winding.

3. An induction-starting, self-synchronizing motor comprising an induction motor connected in cascade with a direct current series generator, the stator winding of the induction motor being in the primary circuit and the rotor of the induction motor having a three phase winding connected to the series generator, the field winding of which is divided into three separate sections, one of these sections being connected to one of the three phase windings of the rotor of the induction motor in a reverse sense to the two others, in such a manner that the currents induced in the phases of the rotor winding act cumulatively magnetically as they flow through said field winding, the rotor of the induction motor being also provided with a high resistance squirrel cage winding, and the said rotor of the induction motor and the armature of the series generator being coupled mechanically.

In witness whereof, we have hereunto signed our names in the presence of two subscribing witnesses.

T. YAMAMOTO.
M. KAWARADA.

Witnesses:
 HIDEO KAI,
 K. KAMBAYASHI.